United States Patent
Yoshida et al.

(10) Patent No.: US 8,303,222 B2
(45) Date of Patent: Nov. 6, 2012

(54) FASTENING BODY STRUCTURE

(75) Inventors: Kazunari Yoshida, Kanagawa (JP);
Masahiro Nakanishi, Kanagawa (JP)

(73) Assignee: Tokai University Educational System, Tokyo (JP)

( * ) Notice: Subject to any disclaimer, the term of this patent is extended or adjusted under 35 U.S.C. 154(b) by 119 days.

(21) Appl. No.: 12/745,989

(22) PCT Filed: Nov. 28, 2008

(86) PCT No.: PCT/JP2008/071734
§ 371 (c)(1),
(2), (4) Date: Jun. 3, 2010

(87) PCT Pub. No.: WO2009/072449
PCT Pub. Date: Jun. 11, 2009

(65) Prior Publication Data
US 2010/0272538 A1    Oct. 28, 2010

(30) Foreign Application Priority Data
Dec. 3, 2007  (JP) .................................. 2007-312827

(51) Int. Cl.
*F16B 43/00*    (2006.01)
(52) U.S. Cl. ........ 411/82.5; 411/188; 411/161; 411/909
(58) Field of Classification Search .................. 411/399, 411/188, 82.5, 909, DIG. 2, 531, 161
See application file for complete search history.

(56) References Cited

U.S. PATENT DOCUMENTS

| | | | |
|---|---|---|---|
| 1,392,242 | A | 9/1921 | Albergoli |
| 1,671,757 | A | 5/1928 | Allen |
| 2,476,586 | A | 7/1949 | Darash |
| 2,789,457 | A | 4/1957 | Allen |
| 3,752,515 | A | 8/1973 | Oaks et al. |
| 3,803,793 | A | 4/1974 | Dahl |
| 3,812,756 | A | 5/1974 | Wenger |
| 4,450,616 | A | 5/1984 | Morita |

(Continued)

FOREIGN PATENT DOCUMENTS
EP    0 549 094 A1    6/1993

(Continued)

OTHER PUBLICATIONS

European Search Report; dated Oct. 17, 2011, Issued on Corresponding EP Application No. 08852156.6.

*Primary Examiner* — Flemming Saether
(74) *Attorney, Agent, or Firm* — Squire Sanders (US) LLP

(57) ABSTRACT

A fastening body structure having a screw member which uses a module screw having a countersunk head and a washer made of a shape memory alloy. With this structure, the washer does not expand even if subjected to large fastening force and the washer can be easily removed when the screw fastening is released. The fastening body structure fastens and fixes a desired part to the installation section by using the screw member having the module screw and the washer. The module screw has a male screw used as a pair with a female screw thread section formed in the installation section. The washer has an inner diameter corresponding to the module screw. An irregular surface section is formed on a slope surface at the lower part of the head of the module screw or on the surface of the washer that makes contact with the screw.

3 Claims, 9 Drawing Sheets

U.S. PATENT DOCUMENTS

| | | | |
|---|---|---|---|
| 4,501,058 A | 2/1985 | Schutzler | |
| 4,636,124 A | 1/1987 | Gugle et al. | |
| 4,657,460 A | 4/1987 | Bien | |
| 4,881,860 A | 11/1989 | Kanazawa | |
| 4,899,543 A | 2/1990 | Romanelli et al. | |
| 5,037,258 A | 8/1991 | Heurteux | |
| 5,199,839 A * | 4/1993 | DeHaitre | 411/387.3 |
| 5,593,120 A | 1/1997 | Hamerski | |
| 5,622,464 A * | 4/1997 | Dill et al. | 411/399 |
| 5,772,378 A | 6/1998 | Keto-Tokoi | |
| 5,791,847 A | 8/1998 | Keto-Tokoi | |
| 5,833,776 A | 11/1998 | Labesky | |
| 5,833,909 A | 11/1998 | Chen et al. | |
| 6,558,097 B2 * | 5/2003 | Mallet et al. | 411/399 |
| 7,210,884 B2 * | 5/2007 | Shindoh | 411/82.5 |
| 2001/0009169 A1 | 7/2001 | Kajiwara et al. | |
| 2001/0035236 A1 | 11/2001 | Ishida et al. | |
| 2002/0062547 A1 | 5/2002 | Chiodo et al. | |
| 2002/0170669 A1 | 11/2002 | Autterson et al. | |
| 2004/0247386 A1 * | 12/2004 | Sugiyama et al. | 403/408.1 |
| 2005/0063796 A1 * | 3/2005 | Dicke | 411/399 |

FOREIGN PATENT DOCUMENTS

| | | |
|---|---|---|
| EP | 1 245 306 A2 | 7/1997 |
| JP | S61-20912 U | 2/1986 |
| JP | S62-110013 A | 5/1987 |
| JP | H2-36616 U | 3/1990 |
| JP | 03-140613 A | 6/1991 |
| JP | 4-113320 U | 10/1992 |
| JP | 05-172299 A | 7/1993 |
| JP | H07-004407 A | 1/1995 |
| JP | 2001-059512 A | 3/2001 |
| JP | 2001-116034 A | 4/2001 |
| JP | 2002-005124 A | 1/2002 |
| JP | 2003-065314 A | 3/2003 |
| JP | 2003-145564 A | 5/2003 |
| JP | 2005-016713 | 1/2005 |
| JP | 2005-016713 B2 | 1/2005 |
| JP | 2006-90348 | 4/2006 |
| JP | 2006-090348 A | 4/2006 |
| JP | 2007-46779 | 2/2007 |
| JP | 2007-046779 A | 2/2007 |
| JP | 2009-14123 | 1/2009 |
| JP | 2009-014123 A | 1/2009 |
| KR | 2002-0067134 A | 8/2002 |

* cited by examiner

FASTENING BODY STRUCTURE

TECHNICAL FIELD

The present invention relates to a fastening body structure, which is applied to manufacturing a product such as an air conditioner, a washing machine, a refrigerator, a television, a cell pack, a simple charger or the like, which have a character of easy disassembling in order to reuse or recycle their component or accessory part or then raw material. More specifically, it relates to the fastening body structure using a washer made of a shape memory alloy and a screw, which is effectively used for disassembling a product.

BACKGROUND

Conventionally, a screw of a product has been manually loosened and removed, in a case where a product with a part to be screwed is disassembled. In recent years, a so-called easy disassembling method has been researched by a combination of a washer made of a shape memory alloy and a screw at the time of fastening. This technology has been developed, and the method has been come into notice from the point of recycling parts and a resource recovery.

Such an easy disassembling technology has been described or disclosed, for example, in Japanese Patent Unexamined Laid-Open Publication No. 16,713 of 2005. At first, a composite product, which is assembled to insert a washer made of a shape memory alloy into a screw, is prepared. The washer made of a shape memory alloy is designed to memorize so as to be a larger inner diameter than an outer diameter of screw head under a condition of being at a predetermined temperature or more. Then, it is regulated and machined to be a smaller inner diameter to a degree that it can be inserted into an axis of screw at the time of fastening parts.

Thus, after using fully a product which is manufactured by fastening parts with the composite product, the product will be disassembled by heating the washer up at the predetermined temperature or more causing that an inner diameter of a washer is restored to be a large diameter as memorized. Then, the washer made of a shape memory alloy is sprung out of the screw head to disassemble the product within a short period.

On the other hand, large fastening forces (torque) are applied to a screw in order to securely fasten a part for secure at the time of screwing. Then, when it is used by a combination of a washer and a screw and the screw head is machined to be a form of countersunk screw, a washer is easily pulled out of the screw head at the time of disassembling a product. In this way, a screw, of which the head has a form of countersunk screw, is convenient at the time of removing a washer.

SUMMARY

However, when a conventional screw is used by a combination of washers made of a shape memory alloy in consideration of good workability at a disassembling time, there are the following problems. In a case where the conventional screw machined to the countersunk screw is directly screwed on a female screw part or an installation surface for the purpose of screwing a fastening piece, a screw head is screwed by its rotation and an inner diameter of a washer enlarges in order to fall within a direction to be larger than an outer diameter of a screw head. As a result, it is difficult to obtain an object for fastening.

The present invention is invented in consideration of the above problem. In a case where a fastening piece is screwed in an installation section with a screw member as used by a combination of a screw having a head with a form of countersunk screw and a washer made of a shape memory alloy, an object of the invention is to provide a fastening body structure, in which it is difficult to expand the washer arm made of a shape memory alloy even at the time of applying a required fastening force and it is easy to remove the washer made of a shape memory alloy at the time of disassembling.

That is, the fastening body structure relating to the present invention is constituted to fasten a fastening piece in an installation section with a screw member. The fastening piece comprises a screw with a head having a form of a countersunk screw provided in one end of a male screw used together with a female screw provided in the installation section as a pair, and a washer made of a shape memory alloy having an inner diameter corresponding to the male screw of the screw and having a form as a part of annular portion cut off therefrom. Then, the washer made of a shape memory alloy is constituted such that an inner diameter thereof is larger in restoring shape than an outer diameter of the screw head at a temperature or more where the shape of material is restored. Further, the fastening piece has a screw hole, and the screw hole is larger in diameter than the screw head and smaller in diameter than the washer made of a shape memory alloy. Still, an unevenness part is provided on a slope surface formed on a lower surface of the screw head being in contact with the washer made of a shape memory alloy, or on a screw contact surface of the washer made of a shape memory alloy being in contact with the screw, and the unevenness part is formed to extend from an inner diameter side to an outer diameter side of the screw head, or from an inner diameter side to an outer diameter side of the washer made of a shape memory alloy.

In the above fastening body structure, when the screw head is screwed in a state that the screw is in contact with the washer made of a shape memory alloy by the unevenness part formed on the slope surface of the screw head or on the screw contact surface of the washer made of a shape memory alloy, the washer made of a shape memory alloy is rotated together with (simultaneously rotated, or integrally rotated) the screw as the unevenness part plays a role of a resistance against a rotating direction of the screw head. Thus, the screw is never screwed in the washer made of a shape memory alloy to expand the washer arm of the washer made of a shape memory alloy. In the fastening body structure, the washer arm is transformed to be larger in diameter than the screw head by heating up the washer made of a shape memory alloy in a predetermined temperature or more at the time of disassembling. As a result, the washer made of a shape memory alloy can be pulled out of the screw without being obstructed by the unevenness part formed in the head.

The fastening body structure is constituted to provide the unevenness part on the slope surface of the screw head or on the screw contact surface of the washer made of a shape memory alloy. The screw can be screwed without expanding the washer arm of the washer made of a shape memory alloy even in a case where a large torque is applied by a screw driver or the like with use of the head having a form of countersunk screw and the washer made of a shape memory alloy constituting a screw head in consideration of the assembling time. Accordingly, the fastening body structure is constituted to fasten the fastening piece surely and strongly, and to be easy to remove the fastening piece by heating up to expand the washer arm made of a shape memory alloy at the time of disassembling. Thus, it is easy to disassemble a product and convenient to perform a recycling of parts or resource recovery.

The fastening body structure is so constituted that the screw has a step portion at a position between the head and the male screw and the step portion is large in diameter of the male screw and small in diameter of the head.

The above fastening body structure is adapted to perform a fastening work in a state that the step portion of the screw is engaged with the washer made of a shape memory alloy and the washer made of a shape memory alloy is always positioned at a central position relative to an axis of the screw.

The above fastening body structure is excellent in its workability and efficiency as the fastening work can be smoothly performed in a state that the washer made of a shape memory alloy is engaged with the step portion provided in the screw.

Moreover, the above fastening body structure is so constituted that the unevenness part is formed to be radial from the central position of a lower surface of the screw head or an upper surface of the washer made of a shape memory alloy to a circumferential edge, and a concave part and a convex part are alternately piled to be continuous in a circumferential direction of a lower surface of the screw head or an upper surface of the washer made of a shape memory alloy.

In the above fastening body structure, when the screw is screwed, the unevenness part press the washer made of a shape memory alloy by the screw head, and the unevenness part is to be engaged (clutched) with a surface of the washer made of a shape memory alloy relative to a rotating direction thereof, and to rotate together with the washer made of a shape memory alloy. The fastening body structure is so constituted that the washer made of a shape memory alloy is smoothly removed from the screw by forming the unevenness part to be radial, in a case where the washer arm is expanded by heating up the washer made of a shape memory alloy at a predetermined temperature or more at the time of disassembling.

The above fastening body structure is so constituted that the unevenness part is formed on the slope surface of a lower surface of the screw head, for example, by knurling based on a pattern (model) formation or a mechanical formation. Therefore, in the fastening body structure, the unevenness part becomes a state rotating together with the screw as it is engaged (clutched) with the washer made of a shape memory alloy relative to the rotation direction of the screw head. Thus, the fastening piece is strongly and rigidly fastened without expanding the washer arm. On the other hand, in the fastening body structure, a work for disassembling products can be effectively processed because the removal of the washer made of a shape memory alloy is not obstructed by the unevenness part.

DETAILED DESCRIPTION

A best mode for carrying out this invention will be described with reference to the drawings.

Figure 1:
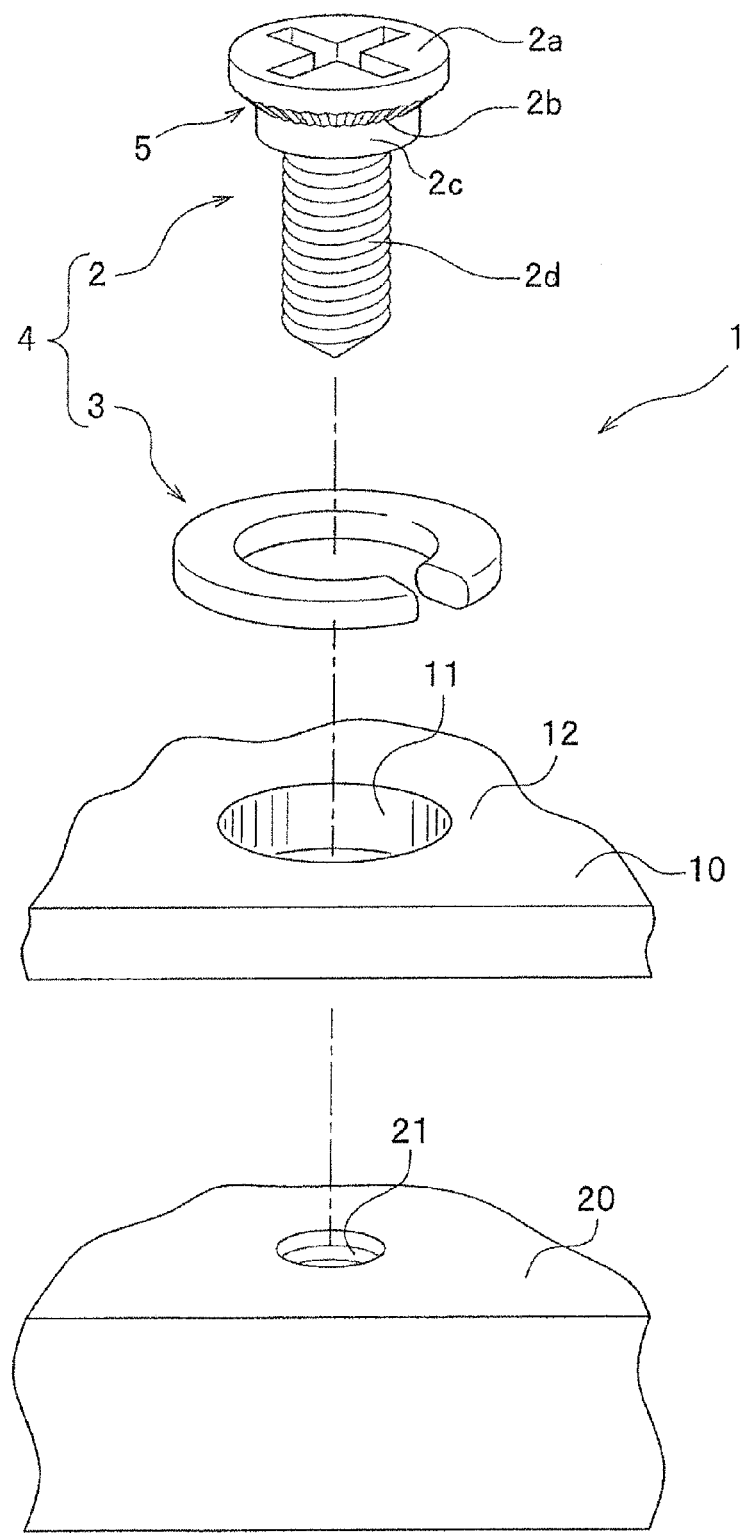
FIG. 1 is an exploded perspective view showing schematically a fastening body structure relating to the present invention.
Figure 2A:
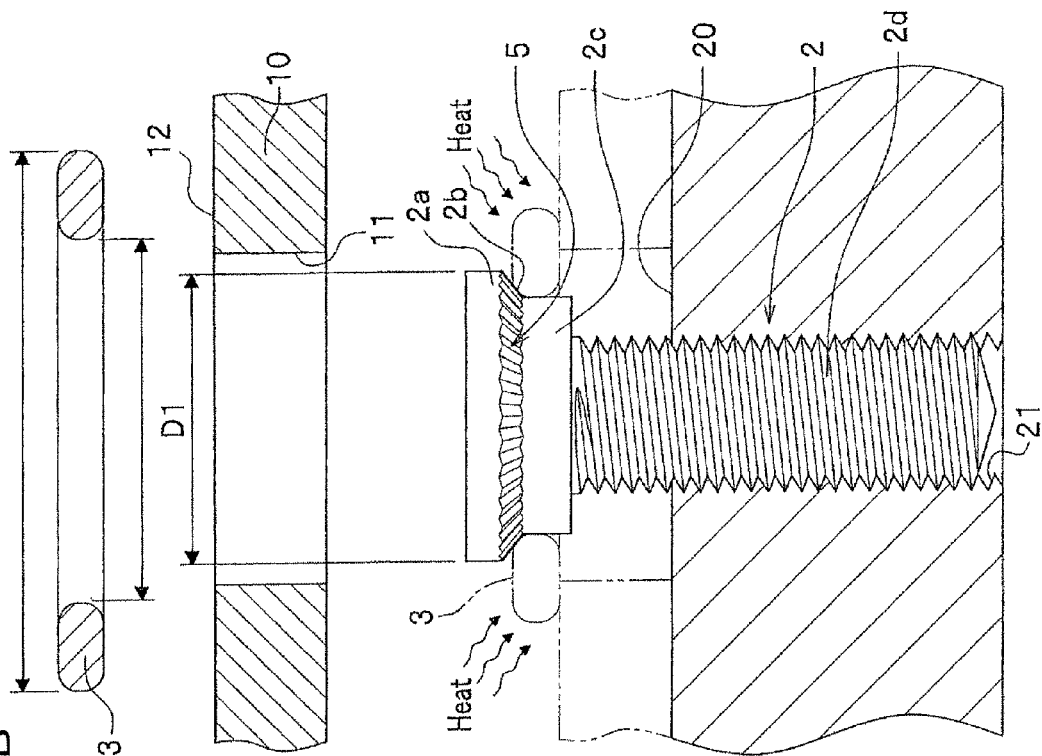
FIGS. 2A, 2B are sectional views showing a sectional view of the fastening body structure relating to the present invention and a sectional view showing an exploded state thereof.
Figure 2B:
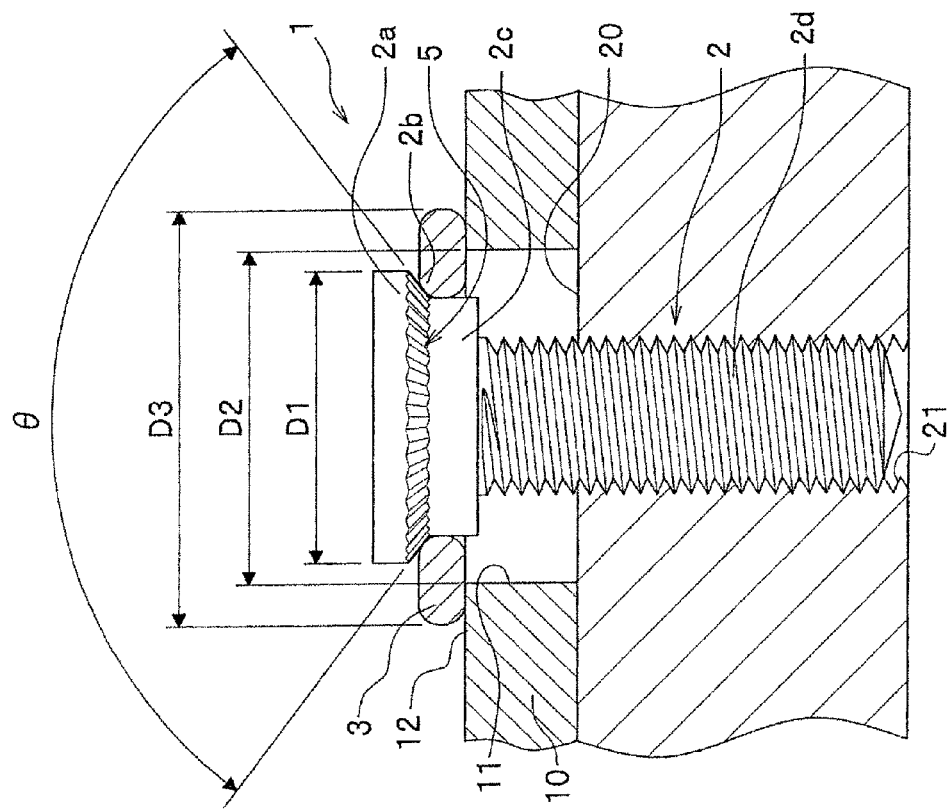
Figure 3A:
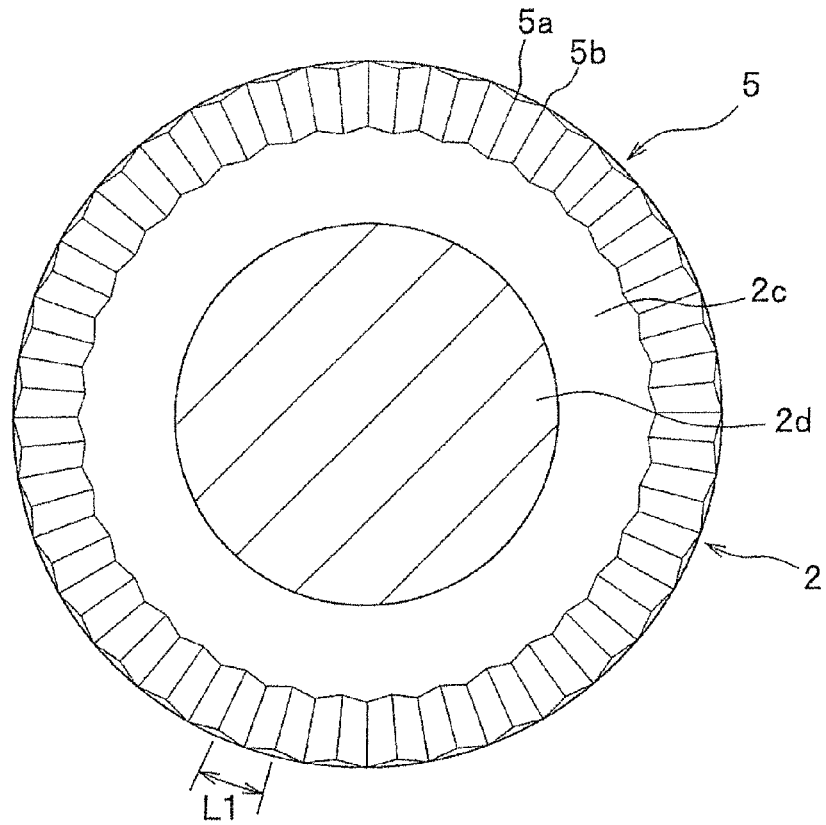
FIG. 3A is a bottom view showing partially a sectional view of a module screw used as the fastening body structure relating to the present invention.
Figure 3B:
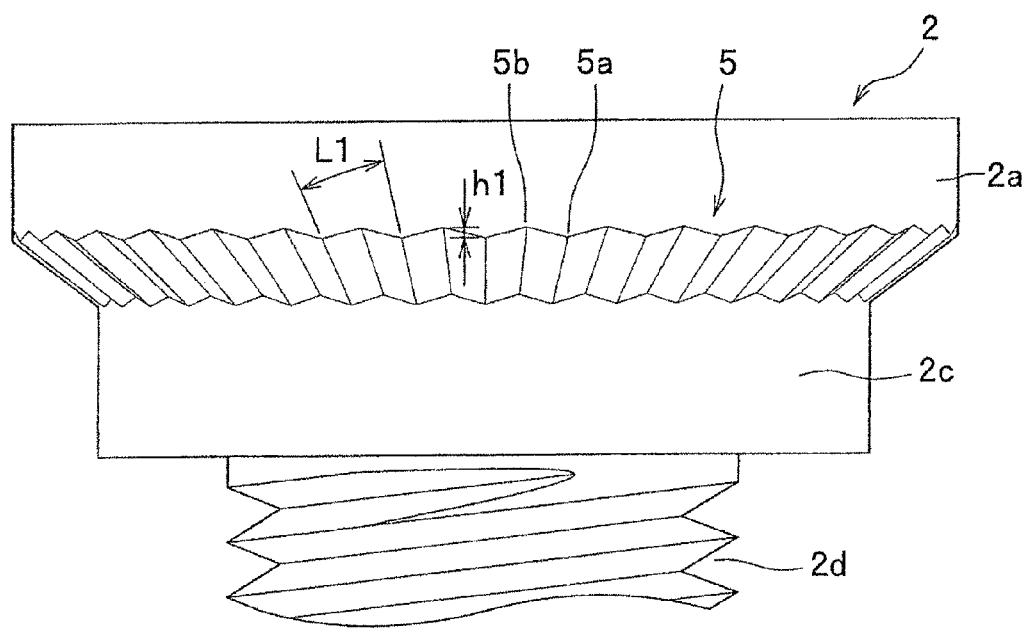
FIG. 3B is a cut away side view showing a head of the module screw used as the fastening body structure relating to the present invention.

FIG. 1 is an exploded perspective view showing schematically the whole constitution of the fastening body structure. FIGS. 2A and 2B are sectional views showing the fastening body structure and a disassembled state thereof, respectively. FIGS. 3A and 3B are a bottom view and a side view showing schematically an unevenness part formed in a module screw head used as the fastening body structure, respectively. FIGS. 4A to 4G are perspective views as partially cut away and side sectional views showing processes for fastening and disassembling of the fastening body structure, respectively.

As shown in FIGS. 1 and 2A, the fastening body structure 1 is so constituted that a fastening piece 10 is fastened to an installation section 20 by inserting a module screw (screw) 2 and a washer 3 made of a shape memory alloy into the fastening piece 10 providing a screw hole 11. Herein, the module screw 2 means a general screw, which is provided with a male screw 2$d$ following a head 2$a$ as a countersunk screw machined or with the male screw 2$d$ following the head 2$a$ as a countersunk screw machined through a shank (step portion) 2$c$.

In the fastening body structure 1, a relationship among the module screw 2, the washer 3 made of a shape memory alloy, the screw hole 11 of the fastening piece 10, and the installation section 20 is designed to be an arrangement and size showing in FIGS. 2A and 2B. That is, a diameter D2 of the screw hole 11 of the fastening piece 10 is formed to be larger than a diameter (an outer diameter) D1 of the head 2$a$ of the module screw 2 and to be smaller than an outer diameter D3 of the washer 3 made of a shape memory alloy. An inner diameter of the washer 3 made of a shape memory alloy is formed to be smaller than the diameter D1 of the head 2$a$ of the module screw 2 at the time of fastening at a normal temperature.

A female screw 21 formed in the installation section 20 is formed to be screwed with the male screw 2$d$ of the module screw 2. In addition, as shown in FIG. 2B, when the washer 3 made of a shape memory alloy is heated up at a predetermined temperature or more, the inner diameter of the washer is initially memorized in form to be larger than the outer diameter D1 of the head 2$a$ of the module screw 2.

As shown in FIGS. 1 and 2A, the module screw 2 is provided with the head 2a as the countersunk screw machined, the shank 2c formed continuously in the head 2a, and the male screw 2d formed continuously in the shank 2c.

The head 2a of the module screw 2 is formed to be smaller in diameter than the screw hole 11 of the fastening piece 10 as described later. This head 2a is provided with a slope surface 2b formed in a lower surface of the head 2a by machining a countersunk screw. A slope angle (countersunk angle) θ is set to fasten a part by a broad range of a fastening torque (for example, 1.1 to 1.37 Nm in case of a male screw (M4) with 4 mm in diameter) as broadly fastened and to easily remove the washer 3 made of a shape memory alloy at the time of disassembling. More specifically, the slope angle (countersunk angle) θ of a slope surface of the head 2a is set to fall within the angle area range from 90 degrees to 175 degrees. When the slope surface 2b of the head 2a falls within the angle area, it can be easily fastened by applying a predetermined fastening force through the washer 3 made of a shape memory alloy thereto. The washer 3 made of a shape memory alloy is easily removed at the time of disassembling. Accordingly, the head 2a is set to fall within the angle range from 90 degrees to 175 degrees. In addition, the slope angle θ is preferable to fall within the angle range from 100 degrees to 170 degrees, and still further preferable to fall within an angle range from 110 degrees to 150 degrees.

As shown in FIGS. 3A and 3B, the slope surface 2b of the head 2a of the module screw 2 is designed to be a whole surface at the lower surface of the head 2a. The slope surface 2b is provided with an unevenness part 5. This unevenness part 5 is provided with the convex part 5a and a concave part 5b having a triangular form in a constant width to extend in a radial direction from an circumferential edge of the lower surface of the head 2a toward a central portion thereof (or, from center to circumferential edge). The unevenness portion 5, that is, the convex part 5a and the concave part 5b in this case, are continuously formed in a circumferential direction of the lower surface of the head. The unevenness part 5 is designed to set a height h1 range from a top of the convex part 5a to a bottom of the concave part 5b as an area ranging from 0.05 to 0.15 mm in this case. In addition, although a number arranged in a circumferential direction of the convex part 5a is not particularly restricted, it is designated as an area ranging from 12 to 42 in number of threads (in particular, a preferable area ranges from 20 to 36 in number of threads).

The convex part 5a is formed at a constant height from a circumferential edge of the lower surface of the head to the center. The module screw 2 forming the unevenness part 5 in the slope surface 2b of such a head 2a can be manufactured by a cold heading and cold forging method.

The shank 2c is formed between the head 2a and the male screw 2d to be larger in diameter than the male screw 2d and to be smaller in diameter than the head 2a. In a case where a work for fastening the module screw 2 is performed, the shank 2c is designed not to fall out the washer 3 made of a shape memory alloy by inserting the washer 3 made of a shape memory alloy and to place in position to arrange the washer 3 made of a shape memory alloy in the center of an axial portion of the module screw 2. As not shown, the temporary fastening of the washer 3 made of a shape memory alloy is easily performed by constituting "collar" or "claw" at a lower extremity of the shank 2c.

The male screw 2d is used as a pair with the female screw 21 provided in the installation section 20 as described later. The male screw 2d is formed to get pointed at a tip thereof.

As shown in FIGS. 1 and 2A, the washer 3 made of a shape memory alloy is formed to be cut off in a part of an annular portion and formed to be in a shape which can separate washer arms placed at left and right positions of the cut away portion. The washer 3 made of a shape memory alloy is machined to an approximately C-letter shape. The washer 3 made of a shape memory alloy is so constituted that an inner diameter thereof is in a restoring state larger than the outer diameter of the head 2a at a temperature or more when the slope of the material is restored.

At the time of fastening, it is so constituted that the washer inner diameter is small and the washer outer diameter is large relative to the diameter D2 of the screw hole 11 of the fastening piece 10. The washer 3 made of a shape memory alloy is so constituted that the washer inner diameter is smaller and the washer outer diameter is larger than a diameter D1 of the head 2a of the module screw 2. Further, it is also constituted such that an outermost diameter at the time of fastening in a normal temperature is D3 and the washer inner diameter therein has a width to be smaller than D1. The washer 3 made of a shape memory alloy may be constituted to exert a spring action by arranging the washer arm to be alternately piled in an upper and lower direction. The washer 3 made of a shape memory alloy can be easily transformed to show a Martensite phase at a normal temperature, and have properties to restore the memorized shape by showing an Austenite phase at a transformation temperature (Martensite transformation temperature) or more. An alloy composition regulating a mixture ratio of various metals is used according to a required transformation temperature.

A Ti—Ni alloy or the like is given as a preferable shape memory alloy used as the washer 3 made of a shape memory alloy, in particular, a Nickel content included in this alloy is preferable to be ranged from 49.5 at % to 51.0 at % (atomic percentage). It may be an alloy included to mix at least one of Cu, Fe, Cr, V, Nb, Co. and the like in this Ti—Ni alloy at an amount of 10 at % or less. For example, the Ti—Ni—Cu alloy is given as an example. Further, A Cu-based alloy such as Cu—Al—Ni, Cu—Zn—Al, Cu—Al—Ni—Mn—Ti, Cu—Al—Mn, Cu—Zn may be used. Otherwise, an alloy such as Au—Cd, In—Ti, Fe—Pt may be used.

When the Ti—Ni alloy is used in the washer 3 made of a shape memory alloy, the shape memory processing is performed such that its inner diameter is more than or equal to D1 (c.f. FIG. 2) at the temperature, that is 400 to 500 C degrees, (for example 450 C degrees), which is more than its transformation temperature or more. (For example, to be in a C-Letter shape or an arc shape forming a notched part or a part to be cut off (gap) in an annular body). And it is designed to machine under pressure in a form of a predetermined inner diameter being smaller than the diameter D1 required at the time of fastening in room temperature (normal temperature). (for example, to be a C-Letter to be within an inner diameter D1 to narrower a notched part or a part to be cut off (slit)). When the washer 3 made of a shape memory alloy is so constituted that the shape memory alloy is, for example, heated up at a temperature of 75 to 100 C degrees or more, in a case where the Martensite transformation temperature ranges 75 to 100 C degrees, the washer 3 made of a shape memory alloy restores a memorized shape, that is, a larger inner diameter than the diameter of the screw head 2a by enlarging a distance between the washer arms as shown in FIG. 2B.

The fastening piece 10 is provided with the screw hole 11 having the diameter D2 formed to be larger than the diameter D1 of the head 2a of the module screw 2. The fastening piece 10 is made of a metal or a synthetic resin. A surface processing such as a coating and rust proof may be processed in a surface of the piece 10. In addition, the fastening piece 10 is provided with a hole circumferential surface 12 being in contact with the lower surface of the washer 3 made of a shape memory alloy on a circumferential surface of the screw hole 11.

The installation section 20 is a portion or a part where the fastening piece 10 is fastened by the module screw 2, and the female screw 21 corresponding to the male screw 2d of the module screw 2 is formed therein.

The female screw 21 is constituted to form a screw inside a tubular member, or to form directly the female screw in a part of the installation section 20. Although the female screw 21 is formed to be longer than a length of the male screw 2d of the module screw 2, it may be shorter than or equal to the male screw 2d. In a case of using a tapping screw, it is constituted without the female screw 21 in the installation section 20.

Figure 4A:
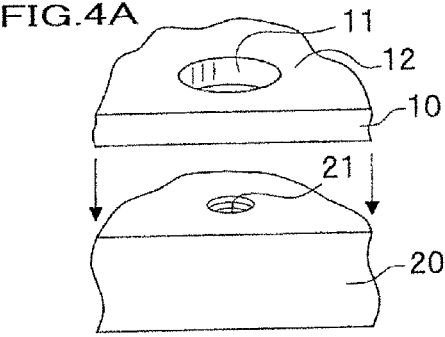
FIG. 4A to 4G are perspective views or side sectional views showing a partial cut away view as for a fastening process and a disassembling process of the fastening body structure relating to the present invention.

Next, processes for fastening and disassembling the fastening body structure 1 will be described with reference to FIG. 4A to 4D, and appropriately with reference to FIG. 2. At first, it is arranged to communicate with the screw hole 11 of the fastening piece 10 in harmony with the female screw 21 of the installation section 20, as shown in FIG. 4A.

Figure 4B:
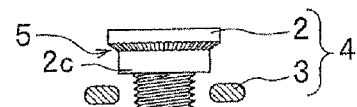

As shown in FIG. 4B, the fastening piece 10 is screwed in the installation section 20 using the screw member 4 engaged by inserting the washer 3 made of a shape memory alloy into the module screw 2. At the time of screwing, a work performance makes better at the time of fastening when the washer 3 made of a shape memory alloy is engaged with the shank 2c of the module screw 2.

Figure 4C:
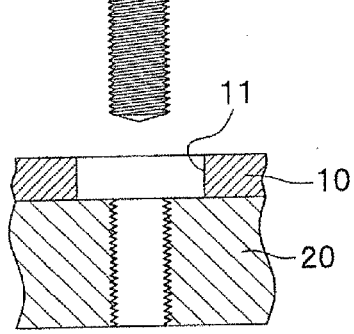
Figure 4D:
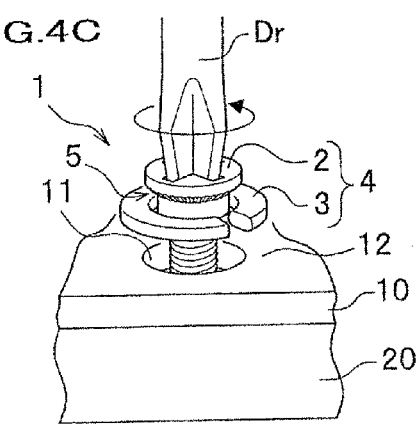

As shown in FIGS. 4C, 4D, the module screw 2 is screwed with a driver Dr by a manual operation or by a robot hand or the like. In a case of fastening the module screw with the male screw having a diameter in 4 mm (M4) or less, a fastening force (fastening torque) is normally applied to be an area range from 0.9 to 1.37 Nm, preferably from 1.0 to 1.25 Nm, and still further preferably in a range of 1.0 to 1.20 Nm.

When the module screw 2 is fastened by the driver Dr in forming the fastening body structure 1, the unevenness part 5 formed in a lower surface of the head 2a of the module screw 2 results in a state of being engaged with a part being in contact with the washer 3 made of a shape memory alloy. As a result, the module screw 2 and the washer 3 made of a shape memory alloy are rotated together, refraining from a force to expand the arm of the washer 3 made of a shape memory alloy. That is, it prevents to expanding the washer arm of the washer 3 made of a shape memory alloy by not imparting a force rotating at the time of screwing the module screw 2 to the washer 3 made of a shape memory alloy. Then, in the fastening body structure 1, the washer 3 made of a shape memory alloy is pressed to the hole circumferential surface 12 of the fastening piece 10 by rotating together the module screw 2 and the washer 3 made of a shape memory alloy by the unevenness part 5. Thus, rigid and strong fastening can be realized by the module screw 2 without expanding the washer arm.

Figure 4E:
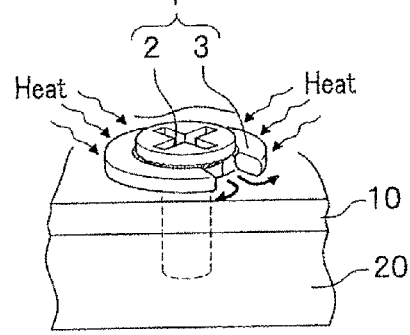

Next, in a case of disassembling a part, the fastening body structure 1 is designed to be placed in an environment being at a temperature more than or equal to the predetermined temperature, which is higher than the Martensite transformation temperature provided in the washer 3 made of a shape memory alloy, as shown in FIG. 4E. For example, when hot air or overheated vapor is blown around the washer 3 made of a shape memory alloy or against the washer 3 made of a shape memory alloy, the washer 3 made of a shape memory alloy restores to the memorized shape. Thus, it results in a state of expanding the washer arm such that the inner diameter part of the washer is larger than a diameter of the head 2a of the module screw 2.

Figure 4F:
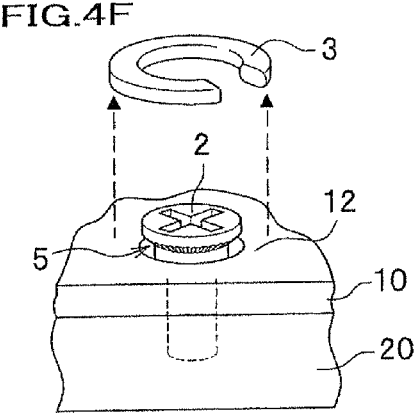

Accordingly, the washer 3 made of a shape memory alloy results in the pulling out of the head 2a of the module screw 2, as shown in FIG. 4F.

Figure 4G:
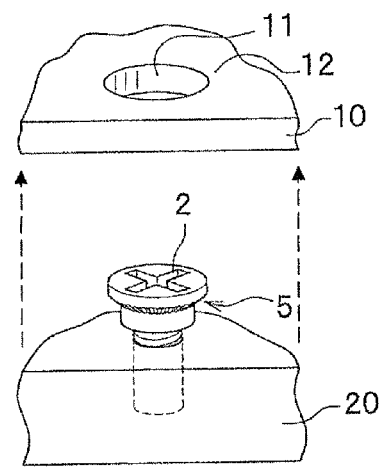

As shown in FIG. 4G, the fastening piece 10 results in removing from the installation section 20 as all of the installation spots of the washer 3 made of a shape memory alloy are removed, as shown only one spot of the installation spots in the Figure. Thus, the fastening piece 10 results in a state of being separated from the installation section 20.

Thereafter, the module screw 2, the washer 3 made of a shape memory alloy, the fastening piece 10, and the installation section 20 result in a separated condition, by which the module screw 2 is removed by rotating the module screw 2 from the installation section 20 with use of the driver Dr or the like. Or, in a case where the installation section 20 is made of synthetic resin, the installation section 20 with the module screw 2 attached may be mechanically crushed or smashed, thus to recover the module screw 2 among things to be crashed.

As above mentioned, the fastening piece 10 may be fastened to the installation section 20 in a desired fastening torque without expanding the washer arm of the washer 3 made of a shape memory alloy by a function of the unevenness part 5 formed in a lower surface of the head of the module screw 2. On the other hand, the fastening piece 10 can be easily removed by releasing the washer 3 made of a shape memory alloy from the module screw 2 at the time of disassembling.

Accordingly, as the fastening body structure 1 is provided with the unevenness part 5 in the slope surface forming a lower surface of the head of the module screw 2, the module screw 2 and the washer 3 made of a shape memory alloy are rotated together at the time of fastening. Then, it is hard to impart a force for expanding the washer arm to the washer 3 made of a shape memory alloy. Accordingly, it can be fastened in a state maintaining the disassembling properties at the time of disassembling, even if a high fastening torque is applied at the time of fastening.

Although the form of the unevenness part 5 used in the fastening body structure 1 is so constituted that forms of the convex part 5a and the concave part 5b are continuous in a constant width along a circumferential direction of the head as a form of triangle in the above description, it may be, for example, constituted as shown in FIGS. 5 to 9. The constitution as described in FIGS. 5 to 9 will be omitted by denoting the same numerical number.

Figure 5A:
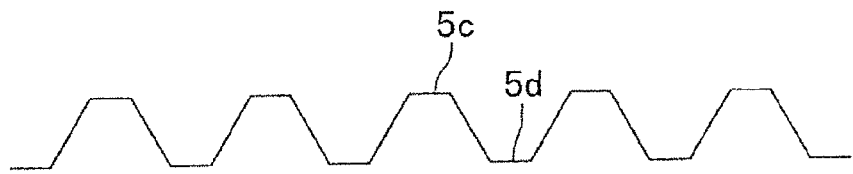
FIGS. 5A, 5B are schematic views showing another constitution of an unevenness part of the fastening body structure relating to the present invention.
Figure 5B:
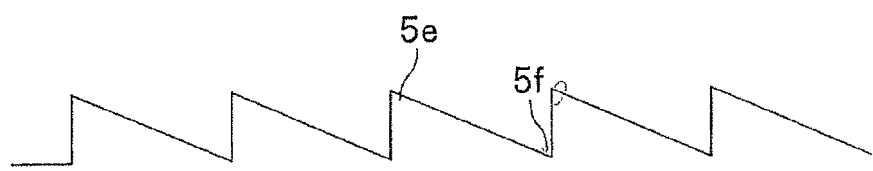

That is to say, it may be so constituted that the trapezoidal convex part 5c and the concave part 5d are continuous along a circumferential direction of the head 2a as shown in FIG. 5A, or it may be so constituted that the serrated convex part 5e having a form, as a vertex of a triangle tilted by the predetermined angles from a vertical direction and the concave part 5f placed between the convex parts 5e are continuous along a circumferential direction of the head 2a as shown in FIG. 5B. In this way, an edge (corner) may be formed in the convex parts 5c, 5e. Furthermore, the convex part 5e and the concave part 5f may be different in form. For example, the concave part may be flat.

Figure 6A:
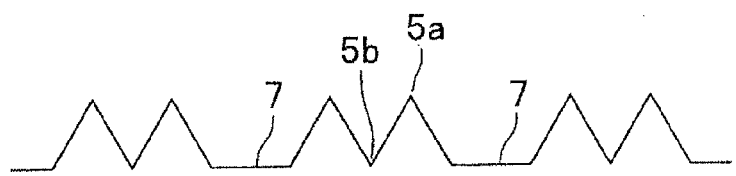
FIGS. 6A, 6B are schematic views of other constitution of an installation interval between a concave part and a convex part of the unevenness part of the fastening body structure relating to the present invention.
Figure 6B:
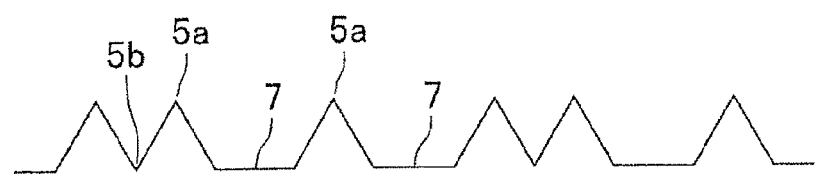

An interval between the convex part 5a and the concave part 5b formed as the same form as the unevenness part 5 may be an equal interval as shown in FIG. 3, or it may be the constitution as shown in FIG. 6. That is, the convex part 5a and the concave part 5b may be formed to be a fixed interval through the flat part 7 as shown in FIG. 6A, or the convex part 5a may be separately formed at the flat part 7 and the convex part 5a and the concave part 5b are mutually continuous to space an interval through the flat part 7 as shown in FIG. 6B.

In this way, in a case where the convex part 5a and the concave part 5b are the same forms each other, it may be separately formed every the predetermined interval through the flat part 7, the convex part 5a and the concave part 5b are formed every the predetermined interval through the flat part 7, or a combination of the both may be formed. In addition, in a case where the convex part 5a formed from an inner circumferential side to an outer circumferential side of the head 2a is formed like an X-Letter shape to cross at an angle of a predetermined angle or more, as the washer 3 made of a shape memory alloy is engaged with a crossing convex part (as not shown), it is hard to be removed. Then, it is not preferable.

Figure 7A:
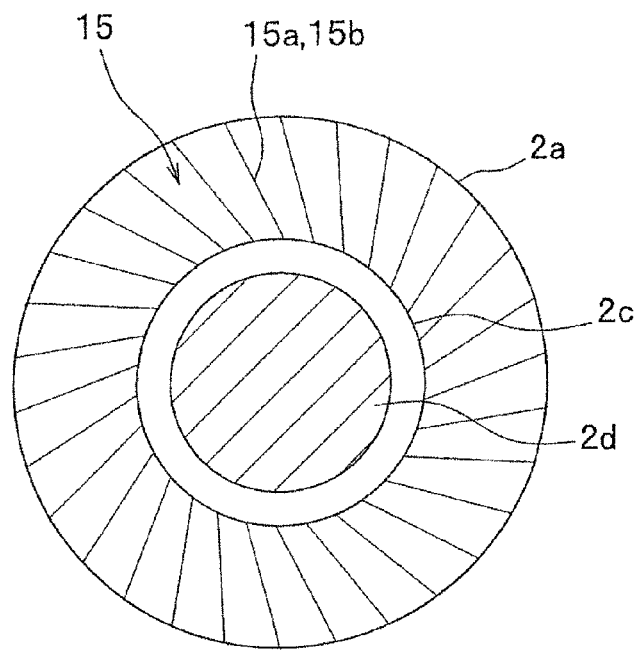
FIGS. 7A, 7B are schematic bottom views showing partial sectional views of a direction forming at the unevenness part of the fastening body structure relating to the present invention.
Figure 7B:
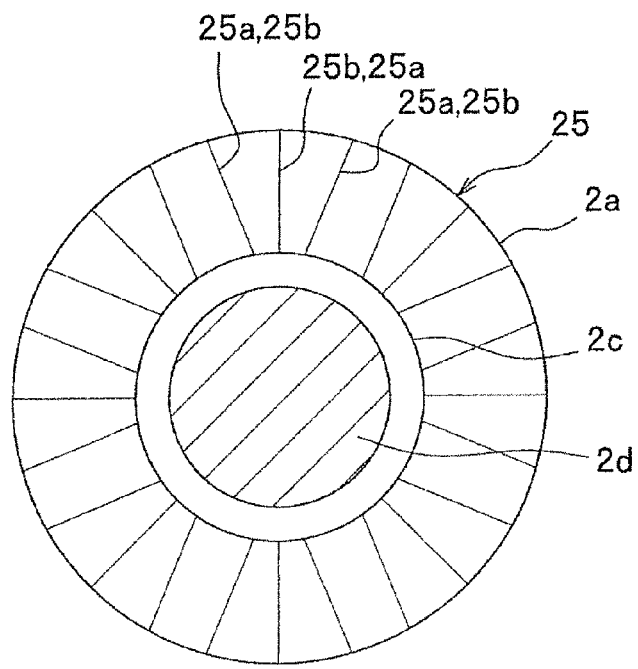

Although a formation direction of the unevenness part 5 has been described as a constitution to be continuous from the center to the circumferential edge of the head 2a and along a circumferential direction of the head 2a in FIG. 3, it may be constituted as shown in FIG. 7. That is, the unevenness part 15 formed in the lower surface of the head 2a may be formed like a spiral at the predetermined angle inclined from the center to the circumferential edge of the head 2a as shown in FIG. 7A. Also, an unevenness part 25 may be constituted such that a concave part (or convex part 25a) 25b, which is formed to be radial from the center to the circumferential edge of the head 2a, and a convex part (or concave part 25b) 25a, which is symmetrical with respect to a line at left and at right position of the radial concave part (or convex part 25a) 25b and arranged at the predetermined angle toward the spacing away direction, as the center concave part 25b spaces along a direction of the circumferential edge, may be provided along a circumferential direction of the head 2a as shown in FIG. 7B. In this way, a formation direction of the unevenness part 5, 25 may be a direction rotating together with the head 2a, and a direction not to make an obstruction against an action to expand the washer arm of the washer 3 made of a shape memory alloy at the time of disassembling.

Figure 8A:
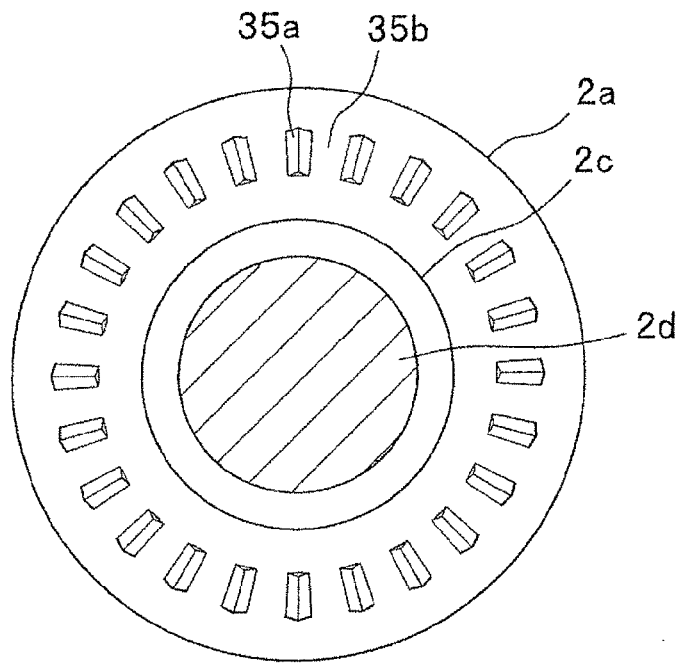
FIGS. 8A, 8B are schematic bottom views showing partial sectional views of another constitution of installation length of the convex part at the unevenness part of the fastening body structure relating to the present invention.

Although an installation length of the convex part 5a and the concave part 5b are continuously provided by a constant width from the shank 2c to a circumferential edge of the head 2a as shown in FIG. 3, the constitution as shown in FIG. 8 may be provided. That is, as shown in FIG. 8A, it may be constituted to form the convex part 35a as formed in a lower surface of the head being in contact with the washer 3 made of a shape memory alloy. That is, the convex part 35a may be constituted to be radial from the center to the circumferential edge of the head 2a between the shank 2c side of the head 2a and the circumferential edge side of the head 2a.

Figure 8B:
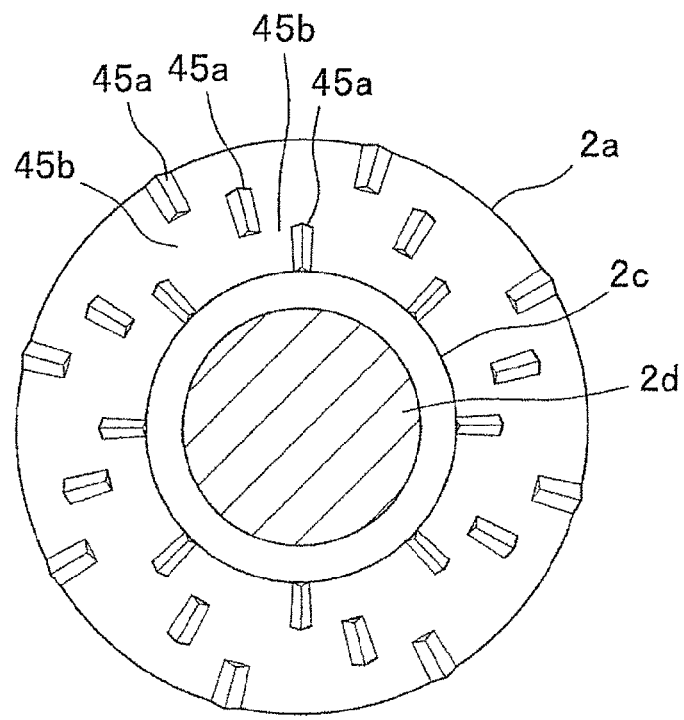

As shown in FIG. 8B, the convex parts 45a are respectively arranged at three annular areas composing of an annular area arranged along a circumferential direction of the shank 2c side at a lower surface of the head 2a, an annular area arranged along a circumferential direction of the circumferential edge side, and an annular area placed between the annular area of the shank 2c side and the annular area of the circumferential edge side. The convex part 45a may be constituted to be in a state arranged like a spiral relative to a circumferential direction of the head 2a. In FIG. 8, the flat part is designed to be the concave parts 35b, 45b. In this way, the installation length of the convex parts 35a, 45a and the concave parts 35b, 45b may be an installation length as being a direction to rotate together with the head 2a and not to obstruct an action to expand the washer arm of the washer 3 made of a shape memory alloy at the time of disassembling.

Figure 9:
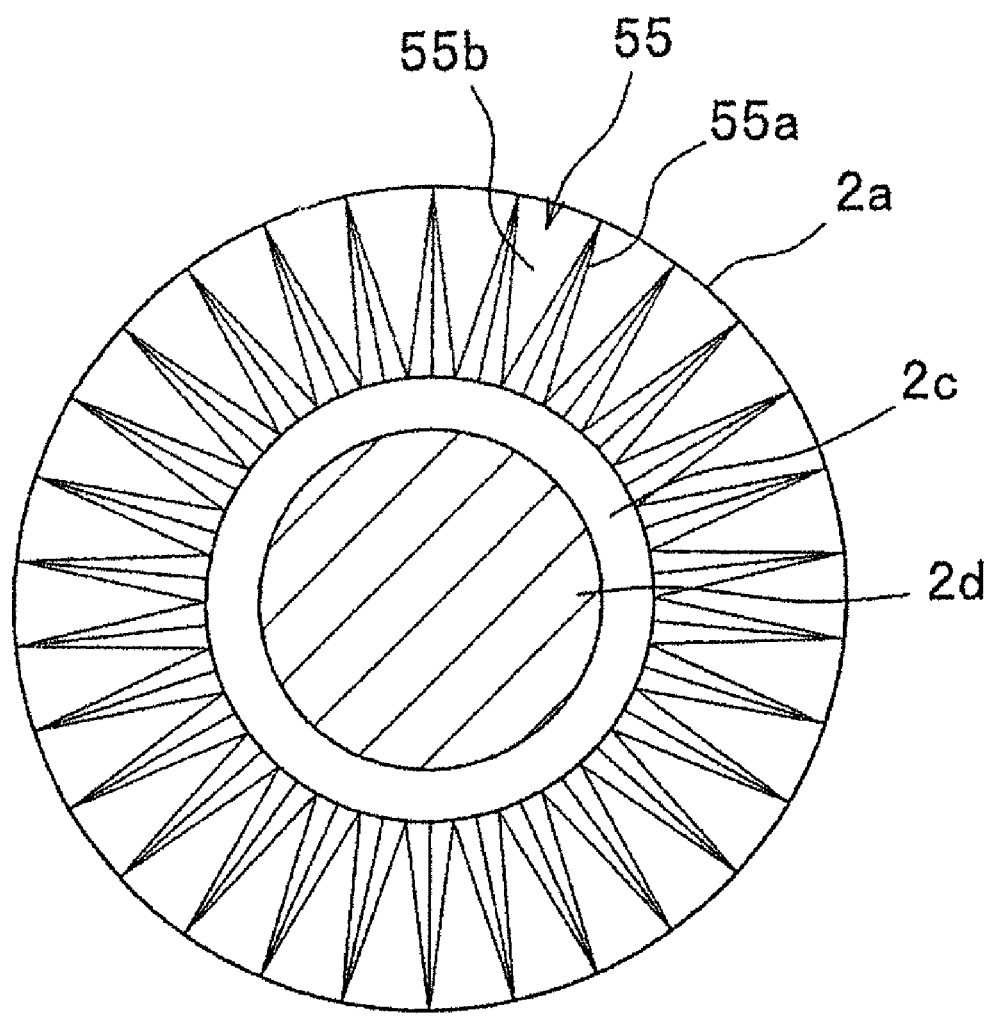
FIG. 9 is a schematic bottom view of a partial sectional view of another constitution of installation width of the convex part at the unevenness part of fastening body structure relating to the present invention.

Although a width formed from the center to the circumferential edge of the head 2a of the unevenness part 5 has been described as a fixed interval as shown in FIG. 3, it may be constituted as shown in FIG. 9. As shown in FIG. 9, the unevenness part 55 is so constituted that the convex part 55a having a form of triangle in section and the concave part 55b having a flat part are alternately formed in a circumferential direction. The convex part 55a is formed to be gradually getting smaller, as it directs from the shank 2c side to the circumferential edge in width and in height. The flat part is designed to be the concave part 55b positioned between two convex parts 55a, 55a.

As it has been described with reference to FIGS. 5 to 9, the unevenness parts are so constituted that the convex part and the concave part are formed to extend from the inner diameter side to the outer diameter side and to arrange along a circumferential direction. When the fastening piece 10 is fastened at a high value of torque, it is engaged (clutched) with the washer 3 made of a shape memory alloy by an edge portion of the convex part. Then, the module screw 2 is screwed by a screw driver or the like to be rotated together with the washer 3 and to be securely fastened. Further, in a case where the washer 3 made of a shape memory alloy is likely to remove from the module screw 2 at the time of disassembling, its constitution is not restricted thereto.

Figure 10:
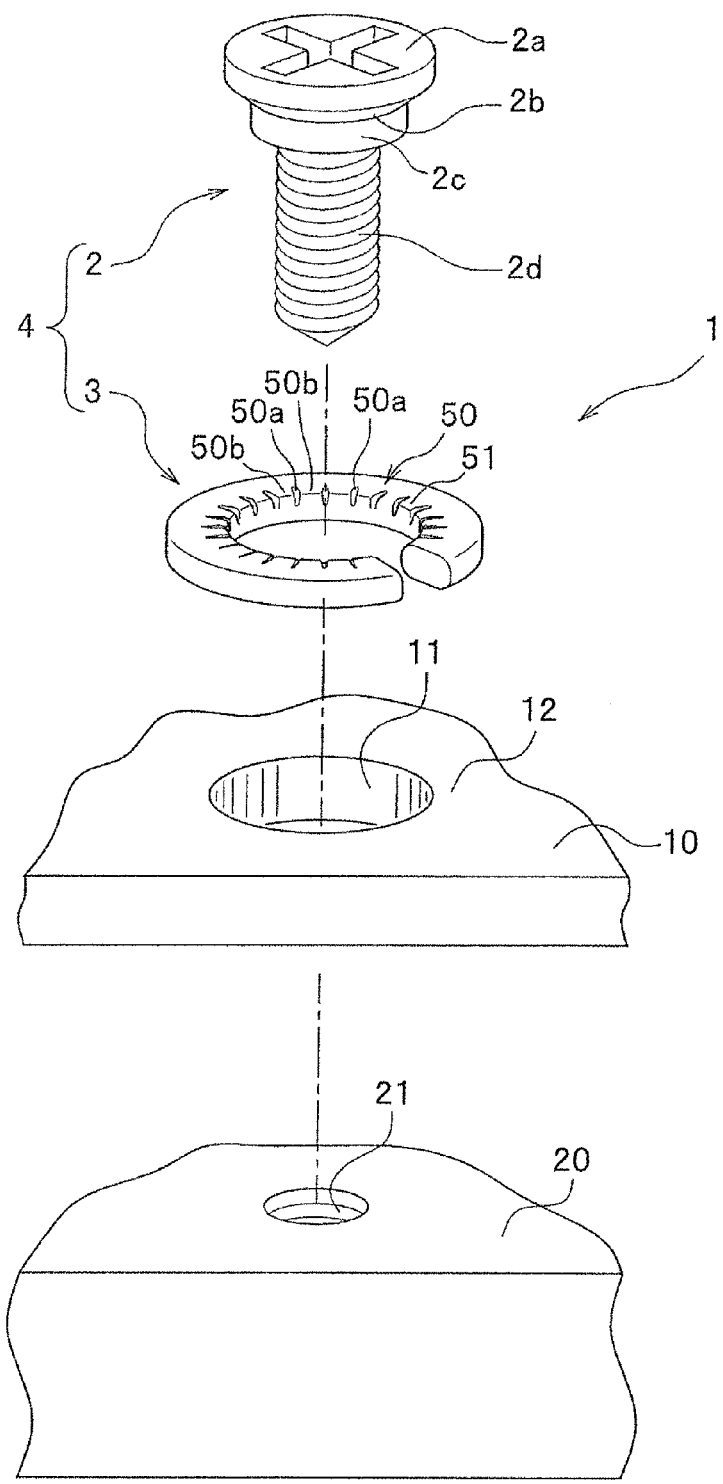
FIG. 10 is a schematic exploded perspective view of another constitution of the fastening body structure.

Although it has been described as a constitution providing the unevenness part 5 in the slope surface 2b of the head 2a of the screw 2 in the description of FIGS. 1 to 9, it may be provided with the unevenness part 50 formed in the screw contact surface 51 of the washer 3 made of a shape memory alloy being in contact with the head 2a of the screw 2 instead of providing the head 2a, as shown in FIG. 10. In a case where the unevenness part 50 is provided in the washer 3 made of a shape memory alloy, a notch having a form of triangle in section is defined as the concave part 50b by forming to be radial in the circumferential direction of the washer 3 and the area between the concave parts 50b and 50b is defined as the concave part 50a.

Although the convex part 50a is formed as a result by providing the concave part 50b, it may be constituted, as not shown, to form the convex part 50a in the screw contact surface 51 of the washer 3 made of a shape memory alloy as a protrusion. As shown in FIGS. 5 to 9, in the convex part 50a and the concave part 50b, the shape, the installation interval, the installation width, and the installation length are designed to provide the fastening piece 10 in the installation section 20 to rotate together with the module screw 2. Further, even in a case where the washer 3 made of a shape memory alloy is constituted to be removed from the head 2a at the time of disassembling, it is not particularly restricted thereto.

Although the screw 2 has been described to be a cone point screw as a tip thereof, a form of the tip may be the form such as flat surface and curved surface, it is not particularly restricted thereto. Although the fastening body structure 1 has been described as an example using the module screw 2, a tapping screw may be used.

AN EXAMPLE

Next, although the present invention will be described through an example, the present invention is not restricted to the following example.

Example 1

A steel plate having length 80 mm, width 30 mm, and thickness 10 mm, which is manufactured by Quenching Steel corresponding to S45C, is prepared. Then, a test piece is perforated in the steel plate with 10 spots spaced at a predetermined interval. A Zaguri (a spot facing or a stepped hole for screwing into a female screw part) with a hole diameter 7.0 mm to a position of an upper depth 4 mm over the steel plate is provided and the female screw with M4.0 is machined in a lower portion. The module screw 2 is so constituted that the unevenness part 5 is formed by knurling in a lower surface of the head 2a, which has a diameter of the head of 6.5 mm and tilted at an inclined angle of 20 degrees (countersunk angle is 140 degrees) as shown in FIGS. 3A, 3B. In this time, the convex part 5a placed in a circumferential direction of a lower surface of the head of the module screw 2 has 36 chevrons in number, and the height h1 is 0.1 mm. The step portion (shank) of the module screw 2 is used to be 5 mm in diameter and the male screw is used to be 10 mm in length.

A Ti—Ni alloy, in which the transformation temperature is 88 C degrees, is transformed to a wire rod by a normal drawing, and then to make a wire by rolling from the upper and lower sides of the wire rod by a rolling mill. Thereafter, a plain surface of the wire is processed to be 1.8 mm by a press or the like and a side surface is processed to be an oblong wire in section having 1.2 mm, and then to round up the wire to be machined in C-Letter type, finally, to be the washer 3 made of a shape memory alloy. The washer 3 made of a shape memory alloy as formed is used in a state of being engaged by being inserted into the step portion (shank) of the module screw.

The module screw 2, which is in a state of engaging with the washer 3 made of a shape memory alloy in each hole provided at 10 spots of the test piece, is fastened at values of 1.1 Nm (30 spots) and 1.37 Nm (10 spots). Then, states as fastened are observed.

The result is shown in Table 1. As shown in Table 1, an expansion of the washer arm is within 0.3 mm from an initial setting at all spots of 30 and 10, and a secure fastening state can be obtained and realized. Accordingly, when the unevenness part 5 is formed in the lower surface of the head of the module screw, it can be securely fastened at the time of applying the strong torque to the module screw.

In addition, a fastening test is performed as a comparative example by using a screw having the same constitution as the above example at 10 spots, except that the unevenness part 5 has not been formed in the slope surface 2b of the head. It has resulted in no strong and hard fastening states as the washer arm of the washer 3 made of a shape memory alloy has been expanded at screwing the module screw 2 in either spot.

TABLE 1

| NO | In Fastening | In Heating |
|---|---|---|
| 1) Fastening Torque: 1.1 Nm | | |
| 1 | ○ | Δ |
| 2 | ○ | ○ |
| 3 | ○ | ○ |
| 4 | ○ | ○ |
| 5 | ○ | ○ |
| 6 | ○ | Δ |
| 7 | ○ | Δ |
| 8 | ○ | ○ |
| 9 | ○ | Δ |
| 10 | ○ | Δ |
| 11 | ○ | ○ |
| 12 | ○ | ○ |
| 13 | ○ | Δ |
| 14 | ○ | ○ |
| 15 | ○ | ○ |
| 16 | ○ | ○ |
| 17 | ○ | Δ |
| 18 | ○ | ○ |
| 19 | ○ | ○ |
| 20 | ○ | ○ |
| 21 | ○ | ○ |
| 22 | ○ | ○ |

TABLE 1-continued

| NO | In Fastening | In Heating |
|---|---|---|
| 23 | ○ | ○ |
| 24 | ○ | ○ |
| 25 | ○ | Δ |
| 26 | ○ | Δ |
| 27 | ○ | Δ |
| 28 | ○ | Δ |
| 29 | ○ | ○ |
| 30 | ○ | ○ |
| OK 82% | 100% | 82% |
| 2) Fastening Torque: 1.37 Nm | | |
| 1 | ○ | ○ |
| 2 | ○ | ○ |
| 3 | ○ | Δ |
| 4 | ○ | Δ |
| 5 | ○ | ○ |
| 6 | ○ | ○ |
| 7 | ○ | ○ |
| 8 | ○ | ○ |
| 9 | ○ | ○ |
| 10 | ○ | ○ |
| OK % | 100% | 90% |

○ means OK & 
X means NG

It was ascertained whether the washer 3 made of a shape memory alloy has been completely removed or not by blowing hot air at 100 C degrees to the washer made of a shape memory alloy as fastened in a predetermined position by a dryer. In the above table, a symbol of "○" is good result (means a piece as completely removed), a symbol of "Δ" is medium result (means a piece as fallen and sandwiched between the screw hole and the module screw of a test piece without completely removed), and a symbol of "X" is bad result (means a piece as not removed from the head 2a). In the symbol "Δ", a rate of passing has been evaluated as 50 percentages.

As shown in Table 1, almost every washers 3 made of a shape memory alloy has come to be removed from the head 2a at the time of heating. In this way, as the unevenness part 5 is formed in a lower surface of the head of the module screw 2, it can be fastened by the predetermined fastening torque at the time of fastening, and the washer 3 made of a shape memory alloy can be surely removed from the head 2a at the time of heating.

Although the module screw 2 has been described by a constitution provided in the shank (step portion) 2c in the above explanation, it may be a screw without the shank 2c.

INDUSTRIAL APPLICABILITY

In the fastening body structure relating to the present invention, an easy disassembling work of products can be obtained, and has some advantages in the recycle of parts or resource recovery.

The fastening body structure relating to the present invention is excellent in its workability and efficiency as a work for fastening between the installation section and the fastening piece is excellently and smoothly performed in a state as the washer made of a shape memory alloy engaged with the step portion provided in the screw.

In the fastening body structure relating to the present invention, the unevenness part provided in the slope surface of the screw head is engaged with the washer made of a shape memory alloy relative to a rotation direction of the screw head, and the both result in rotation together with the screw. Thus, the fastening piece can be strongly fastened without expanding the washer arm.

In the fastening body structure relating to the present invention, an efficient disassembling work of products can be obtained at the time of disassembling, never to fail in a function of preventing the washer from pulling out caused by the unevenness part on the slope surface of the screw head.

Furthermore, in the fastening body structure relating to the present invention, the fastening piece can also be strongly fastened without expanding the washer arm by providing the unevenness part in the screw contact surface of the washer instead of providing the unevenness part in the slope surface of the screw head, and also the products can be effectively disassembled without making the removal of the washers to be obstructed at the time of disassembling.

The invention claimed is:

1. A fastening body structure for fastening a fastening piece in an installation section with a screw member, the structure comprising:
  a screw comprising a head having a countersunk form, wherein the head is provided in one end of a male screw part configured to be used together with a female screw part provided in the installation section, and
  a washer made of a shape memory alloy, wherein the washer has an inner diameter corresponding to the male screw part of the screw, and wherein a part of an annular portion of the washer is cut off,
wherein
  the inner diameter of the washer is larger in a restoring shape than an outer diameter of the screw head, wherein the washer assumes the restoring shape at or above a restoring temperature,
  the screw head is configured to be smaller in diameter than a screw hole of the fastening piece, and the washer is configured to be larger in diameter than the screw hole of the fastening piece,
  an unevenness part is provided on a slope surface formed on a lower surface of the screw head being in contact with the washer made of a shape memory alloy, or on a screw contact surface of the washer made of a shape memory alloy being in contact with the screw, and
  the unevenness part is formed to extend from an inner diameter side to an outer diameter side of the screw head, or from the inner diameter side to an outer diameter side of the washer made of a shape memory alloy.

2. The fastening body structure according to claim 1, wherein
  the screw has a step portion at a position between the head and the male screw, the step portion being larger in diameter than the male screw and smaller in diameter than the head.

3. The fastening body structure according to claim 1 or 2, wherein
  the unevenness part is radially formed from an upper central portion of the washer made of a shape memory alloy to a circumferential edge or from a lower central portion of the screw head to a circumferential edge, and
wherein
  a concave part and a convex part are alternately piled to be continuous in a circumferential direction of a lower surface of the screw head or an upper surface of the washer made of a shape memory alloy.

* * * * *